United States Patent [19]

Okamuro

[11] 4,186,598
[45] Feb. 5, 1980

[54] BELT TENSION GAUGE

[75] Inventor: James A. Okamuro, Oshtemo Township, Kalamazoo County, Mich.

[73] Assignee: Borroughs Tool & Equipment Corporation, Kalamazoo, Mich.

[21] Appl. No.: 936,075

[22] Filed: Aug. 23, 1978

[51] Int. Cl.² .............................................. G01L 5/06
[52] U.S. Cl. ..................................................... 73/144
[58] Field of Search ........................................ 73/144

[56] References Cited

U.S. PATENT DOCUMENTS 2,996,914  8/1961  Delehanty ........................... 73/144

FOREIGN PATENT DOCUMENTS 2305722  10/1976  France ........................... 73/144

Primary Examiner—Charles A. Ruehl
Attorney, Agent, or Firm—Blanchard, Flynn, Thiel, Boutell & Tanis

[57] ABSTRACT

A tension gauge for accurately and visually indicating the tension on an elongated element, such as an automobile fan belt, even though such element is irregular in size or shape. The tension gauge has a frame and two spaced surfaces supported on the frame for engaging one side of the element. A spring-loaded first element engaging member is supported on the frame for applying a known force to the opposite side of the element at a point intermediate the surfaces. A second element engaging member is supported on the frame and is responsive to the deflection induced in the element by the force applied by the first member. An indicator on the frame provides a visual display of the deflection measured by the second element, such deflection being proportional to the tension on the element.

12 Claims, 7 Drawing Figures

BELT TENSION GAUGE

FIELD OF THE INVENTION

The present invention relates to an improvement in tension gauges used to accurately measure and visually indicate the tension on an elongated element, such as an automobile fan belt and, more particularly, an improvement to structure disclosed in U.S. Pat. No. 2,996,914.

BACKGROUND OF THE INVENTION

The need for and use of a gauge for testing the tension on an elongated flexible element, such as the reach of a belt, are well known, particularly in the automobile industry. Such devices have been developed and are in use, but frequently provide inaccurate results. The inaccuracy arises largely from the fact that at least the inexpensive forms of tension gauges do not allow for variations in thickness of the element being tested, which variations result from wear or irregularities created during the use or construction of the element. For example, existing gauges designed to test fan belts are usually arranged for engaging the belt at three spaced points, the intermediate point being on the opposite side of said belt from the outer points. The gauge is calibrated, when manufactured, for a belt of selected thickness. Thus, if the belt is irregular in size, or is worn, or is otherwise different from the calibrated standard, the indications of the gauge will be inaccurate.

Prior efforts to eliminate this inaccuracy have been fully satisfactorily solved, for example, utilizing the tension gauge disclosed in U.S. Pat. No. 2,996,914. This tension gauge comprises a mechanism in which the indication of tension in the belt is independent of variations in belt thickness. The disclosed structure, however, necessitates a gauge size too large to be used in many applications where space is limited, and is relatively expensive to manufacture, due in part to the mechanical complexity involved in combining the mechanisms that stress the belt and measure the resulting element deflection.

Accordingly, the objects of the present invention include:

1. The provision of a tension gauge for detecting and indicating tension on an elongated flexible element, such as the fan belt of an automotive vehicle, arranged to compensate automatically for variations in the thickness of the element being tested.

2. The provision of a tension gauge as aforesaid which is pleasing in appearance, simple and inexpensive to manufacture, sufficiently small in size to permit use in limited spaces, and sufficiently sturdy in structure to withstand rugged treatment.

3. The provision of a tension gauge as aforesaid, which is foolproof in operation, easily operated with one hand by a garage mechanic, and requires little or no maintenance.

SUMMARY OF THE INVENTION

The objects and purposes of the invention, including those set forth above, have been met by providing a gauge for testing the tension of an elongated flexible element, such as an automobile fan belt, wherein simpler, more efficient, independent mechanisms have been developed to stress the belt and to measure the deflection thereof. In particular, the gauge comprises a frame, two spaced surfaces supported on the frame for engaging one side of the element, a spring loaded first element engaging member supported on the frame for applying a known force to the opposite side of the element at a point intermediate the surfaces, a second element engaging member supported on the frame independent of the first member and being responsive to the deflection induced in the element by the force applied by the first member, and an indicator providing a visual display of the deflection measured by the second element, such deflection being proportional to the tension on the element.

Figure 1:
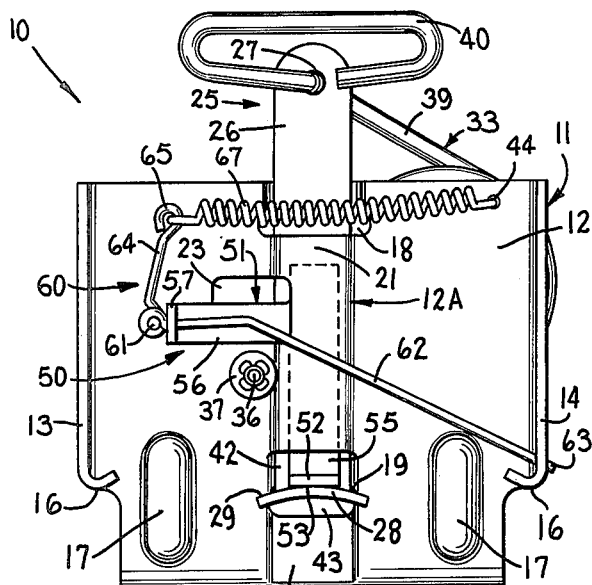
FIG. 1 is a front elevational view of a tension gauge embodying the present invention.

For convenience in description, the terms "upper", "lower", "front" and "rear" and derivatives thereof will have reference to the gauge as appearing in the drawings, according to the above descriptions. The terms "inner", "outer" and derivatives thereof will have reference to the geometric center of said tension gauge and parts thereof.

DETAILED DESCRIPTION

With reference to FIG. 1, the tension gauge 10 herein selected to illustrate the present invention, comprises a frame 11, a manually operable plunger 25 reciprocably slidably supported on the frame 11, and a tension indicator mechanism 50 supported on the frame 11.

Figure 3:
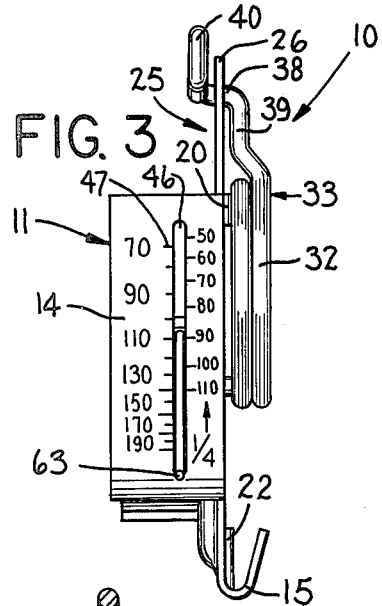
FIG. 3 is a side elevational view of the tension gauge.

The frame 11, which is preferably fabricated from a single piece of sheet metal, is esentially U-shaped, comprising a substantially planar base wall 12 of substantially rectangular shape, and two planar sidewalls 13 and 14 formed at the lateral edges of the base wall 12 and extending away therefrom at substantially right angles thereto (FIGS. 1 and 3). The lower end edge, as viewed in FIG. 1, of each sidewall 13 and 14 is bent inwardly toward each other in a J shape, to form surfaces 16 (FIG. 4) for engaging an elongated element, such as a belt 8. The vertical dimension of each sidewall 13 and 14 is less than that of the base wall 12, such that the base wall 12 extends downwardly through a substantially horizontal plane containing the element engaging surfaces 16. The sidewall 14 has an elongated and vertical slot 46 therein. Adjacent the junctures of the base wall 12 and each element engaging surface 16, the material of the base wall 12 is deformed frontwardly to form a convex, vertically elongate protuberance 17, positioned so as to be substantially bisected by the plane containing the surfaces 16. Below the convex projections 17, the lower edge 15 of the base wall 12 is bent rearwardly and upwardly in substantially a J shape, as shown in FIG. 3.

The material of the base wall 12 is deformed in the mid-section 21 along a line parallel to and midway between the sidewalls 13 and 14. This midsection portion 21 projects frontwardly over a majority of the height of the base wall 12. The upper and lower extremities of the midsection 21 are deformed rearwardly at 20 and 22. Two guide slots 18 and 19 are provided in the base wall 12 at the juncture of the midsection segment 21 with the midsection segments 20 and 22. The guide slots 18 and 19 are vertically spaced and are each positioned midway between the sidewalls 13 and 14. The guide slot 18 is generally rectangular in shape, having a lateral dimension substantially greater than its vertical dimension. The guide slot 19 is divided into an upper segment 42 and a lower segment 43 by the plane containing the element engaging surfaces 16. The lower segment 43 of slot 19 is generally rectangular in shape, having substantially the same dimensions as slot 18. The upper segment 42 of slot 19 is also generally rectanglar in shape, having a lateral dimension less than that of the lower segment 43 of slot 19, and a vertical dimension approximately equal to its lateral dimension.

There is a third substantially rectangular guide slot 23 in the midsection portion 21 of the base wall 12, positioned intermediate slots 18 and 19 with a small lateral offset portion extending toward sidewall 13, such that part of the slot 23 extends into the nonplanar midsection 21 of base wall 12, and the remaining part of slot 23 extends in the adjacent planar area of base wall 12.

Figure 4:
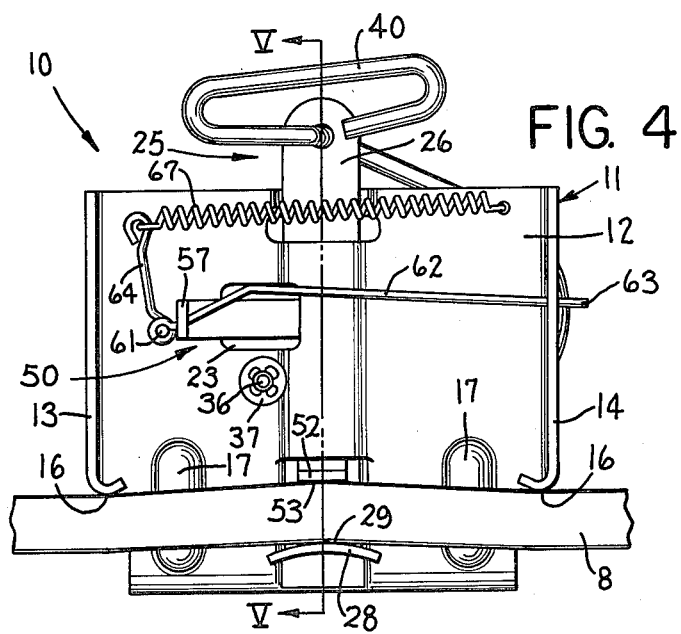
FIG. 4 is a view of the tension gauge of FIG. 1 operationally engaged with an elongated element.
Figure 5:
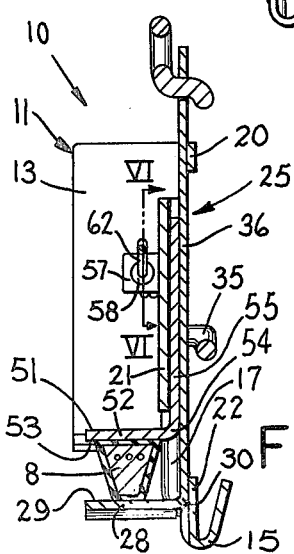
FIG. 5 is a sectional view taken along the line V—V in FIG. 4.

The plunger 25 comprises an elongate plunger bar 26, reciprocally slidably received in the guide slot 18 and in the lower portion 43 of the guide slot 19, for movement along an axis substantially perpendicular to the plane containing the element engaging surfaces 16. The bar 26 is oriented substantially coplanar with the base wall 12 (FIG. 5). The lower end of the plunger bar 26 is wider than the remainder thereof, and is bent at substantially a right angle 30 with respect to said bar 26 to form a frontwardly extending flange 28 (FIG. 5). The flange 28 is also bent so as to present an arcuate, upwardly-facing surface 29 for engagement with an elongate element, such as the belt 8 (FIG. 4). Upward movement of the plunger bar 26 is limited by the point at which the width of said flange 28 prevents its entry into the narrow upper portion 42 of slot 19, as best illustrated in FIG. 1. In this limiting position, the uppermost portion of the upwardly-facing surface 29 is tangent to the plane containing the element engaging surfaces 16 of the sidewalls 13 and 14. In other words, the surface 29 is, in a terminal position, generally coplanar with the element engaging surfaces 16.

Figure 2:
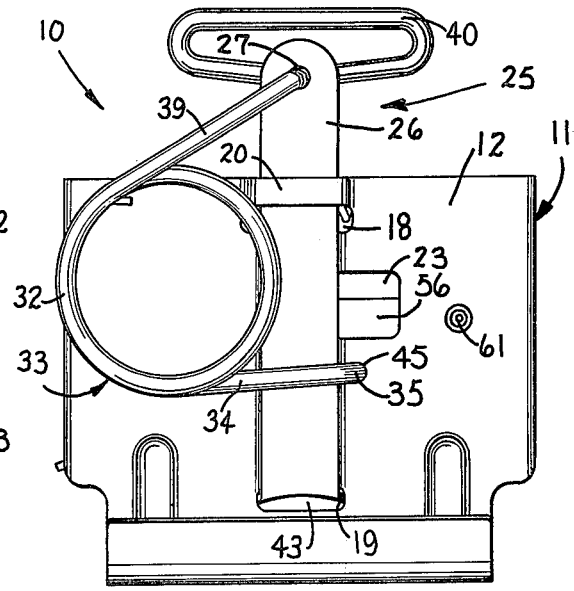
FIG. 2 is a rear elevational view of the tension gauge.

The plunger bar 26 is continually urged upwardly by a coil spring 33, mounted on the rear side of the base wall 12 such that the coils 32 are substantially parallel to the plane of the base wall 12 (FIG. 3). The spring 33 has two tangentially extending arms 34 and 39 (FIG. 1). The arm 34 has a right angle bend 35 adjacent the terminal end 36 thereof, which permits the end 36 to pass through a hole 45, located just below slot 23 in the base wall 12 (FIG. 2). The terminal end 36 of the spring 33 extends to the front side of the base wall 12, where it is secured against removal from the hole 45 by a grip washer 37. The arm 39 has a right-angle bend 38 therein which permits the arm 39 to be received in a hole 27 located at the top of the plunger bar 26. The terminal end portion of the arm 39 extends to the front side of the plunger bar 26, where it is formed into an elongate oval-shaped bend 40, to function as a handle and effect a securement against removal of the arm 39 from the hole 27.

The tension indicator mechanism 50 comprises a substantially inverted L-shaped member 51 having two legs 55 and 56 that form a right angle with respect to each other. Leg 55 is reciprocally slidably received between the plunger bar 26 and the midsection portion 21 of the base wall 12, as best illustrated in FIG. 5, for independent movement along a vertical axis parallel to the axis of movement of the plunger bar 26. The leg 55 extends downwardly into the upper portion 42 of slot 19, where the end of leg 55 is bent at substantially a right angle 54 with respect thereto (FIG. 5), forming a flange 52 extending perpendicular to the plane of the base wall 12 and having a downwardly facing surface 53 for engaging an elongate element, such as the belt 8 (FIG. 4). The leg 56 extends laterally horizontally through the slot 23 toward sidewall 13, and slides up and down in said slot 23 within limits established by the top and bottom edges of the slot 23, whereby movement of the leg 55 and movement of the flange 52 within the upper portion 42 of slot 19 are correspondingly limited. The free end of the horizontally extending leg 56 is bent to form a flange 57 extending frontwardly at substantially a right angle to the leg 56. An opening 58 is provided in the flange 57. The wall of the opening 58 is conical in shape opening toward the sidewall 14.

Figures 6, 7:
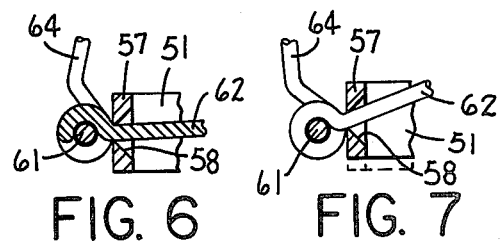
FIG. 6 is a sectional view taken along the line VI—VI in FIG. 5.
FIG. 7 is a view of the structure of FIG. 6 in a different position of operation.

The tension indicating mechanism 50 also includes a two-arm, L-shaped lever 60 (FIG. 1), formed from wire sufficiently stiff to retain its shape when subjected to normal operational forces. The lever 60 is pivotally mounted for rotation within a plane parallel to the plane containing the base wall 12, by means of a pivot pin 61 secured to the base wall 12 at a point closely adjacent the flange 57 on the arm 56 of the sliding member 51. One arm 62 of the lever 60 extends substantially horizontally from the pivot pin 61 through the conical opening 58 in the flange 57 (FIG. 6), and then extends laterally across the gauge 10 such that the tip or free end 63 of the arm 62 is slidably received in the vertically extending slot 46 (FIG. 3). As best shown in FIGS. 6 and 7, the conical opening 58 in flange 57 facilitates a frictionless cooperation between the linear up and down movement of the flange 57 and the pivotal movement of arm 62 about pivot pin 61.

As the arm 56 slides upwardly or downwardly in the slot 23, the corresponding movement of the flange 57 acts on the arm 62 of the lever 60 at a point between the pivot pin 61 and the tip 63 (FIG. 7) and as close as possible to the pin 61 without frictionally restricting the movement of the lever 60. The close spacing between the pin 61 and the flange 57 produces a proportionally greater upward or downward movement respectively of the tip 63 in the slot 46 (FIG. 4). The tip 63 of the arm 62 will be adjacent the upper or lower end of slot 46 when upward or downward movement respectively of arm 56 and flange 57 is limited by the upper or lower edges, respectively, of the slot 23. The outwardly facing side of the sidewall 14 has calibrated markings 47 thereon extending along the side of the slot 46. The tip 63 is alignable with the calibrated markings 47 to provide a direct reading of the tension in the belt 8, in a manner to be described hereinafter. The inwardly facing surface of the sidewall can, if desired, also have calibrated markings thereon.

The arm 64 of the lever 60, which is shorter than arm 62, extends upwardly from the pivot pin 61 at substantially a right angle to the arm 63, and has an eye 65 formed at the end thereof. One end of a spiral expansion spring 67 engages the eye 65, and the other end of the spring 67 engages a hole 44 in the top of the base wall 12 near sidewall 14. The spring 67 continually urges rotation of the lever 60 around the pivot pin 61, such that tip 63 of arm 62 is urged toward the bottom of slot 46 in the sidewall 14, and whereby arm 62, in turn, acts on the flange 57 to urge the leg 56 downwardly in the slot 23 of the base wall 12.

OPERATION

In general, the tension gauge is operated by manually grasping it so that the handle 40 rests in the palm of the hand and lower end 15 of the base wall 12 is grasped by the fingers of that hand. By manually squeezing the handle 40 toward the lower end 15 of the base wall 12 until the arm 39 of the coil spring 33 engages the top of the base wall 12, the plunger bar 26 is forced downwardly against the urging of the coil spring 33, moving the element engaging surface 29 on the flange 28 of the plunger bar 26 away from the element engaging surface 53 on flange 52 of the sliding member 51. Simultaneously, flange 52 is urged to the bottom-most position in the upper portion 42 of slot 19 by the spring 67.

The tension gauge 10 is now moved frontwardly toward a belt 8, until the belt 8 contacts the convex protuberances 17 of the base wall 12 (FIG. 5), which automatically place the belt 8 in the proper position with respect to the surfaces 29 and 53 of the flanges 28 and 52, respectively, and the surfaces 16 of sidewall 13 and 14. Manual pressure on the handle 40 is now released slowly, and the tension in spring 33 results in an upward movement of the plunger bar 26 until the belt 8 is engaged by both of the surfaces 29 and 53, followed by an upward movement of the sliding member 51 and the plunger bar 26 until the tension in the belt 8 and the upward urging of spring 33 are balanced, the downward urging of spring 67 through the element engaging surface 53 being negligible with respect to the upward urging of the spring 33 through the element engaging surface 29. The small force from the spring 67 is further minimized due to the small spacing between the pin 61 and the flange 57 thereby providing a very small moment arm. The upward movement of sliding member 51 acts on the arm 62 of lever 60 through the flange 57 and the opening 58 therein to effect a proportionally larger movement of the tip 63 of the arm 62 in the slot 46 of the sidewall 14, as hereinabove described, whereby the tension in the belt 8, being proportional to the upward distance that the belt 8 has moved the sliding member 51, can be read directly from the calibrated markings 47 adjacent tip 63.

The positive relation between the movement of the flange 52 and the indicator tip 63 permits accurate reading of the tension in the belt 8. Because of the fact that the upper surface of the belt 8 engages both the surfaces 16 and the surface 53, and because the tension reading is an indication of the relative deflection of surface 53 with respect to the plane containing the surfaces 16, variations in the thickness of the belt 8 are of no consequence in the results produced by the tension gauge 10, affecting neither the zero position of the tension indicator 50 nor the final tension reading obtained therefrom.

After the tension has been observed from the calibrated markings 47, the handle 40 is again manually pressed downwardly until the arm 39 of the coil spring 33 engages the top of the base wall 12. This releases the grip of surfaces 29 and 53 on the belt 8, and permits removal of the tension gauge 10 from engagement with the belt 8. The pressure on the handle 40 is again fully released, and the operation of the tension gauge 10 is complete.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a gauge for determining the tension on an element, comprising a frame having a pair of spaced coplanar first element engaging surfaces facing in substantially the same first direction, a first element engaging member supported on said frame for movement substantially parallel with said first direction, said first element engaging member having a second element engaging surface movable into and out of a first terminal position disposed between said first element engaging surfaces and substantially within the plane defined by said first element engaging surfaces, first resilient means urging said first element engaging member in a second direction opposite said first direction, and means supported on said frame for indicating the tension in said element, the improvement comprising:
   a second element engaging member slidably supported on said frame for movement independent of said first element engaging member and substantially parallel with said first direction, said second element engaging member having a third element engaging surface facing in said first direction and movable between said first terminal position disposed between said first element engaging surfaces and substantially within said plane defined by said first element engaging surfaces and a second terminal position;
   second resilient means urging said second element engaging member in said first direction toward said first terminal position;
   wherein said second element engaging surface of said first element engaging member faces in said second direction, and said first resilient means urges said first element engaging member toward said first terminal position;
   wherein said indicating means includes means responsive to the movement of said second element engaging member and said third element engaging surface thereon away from said first terminal position in said second direction to said second terminal position, the spacing between said first and second terminal positions being proportional to the tension on said element; and
   wherein said frame is defined by a generally U-shaped member having a base wall and a pair of parallel sidewalls disposed along the lateral edges thereof, said base wall having guide means thereon for guiding said first and second element engaging members.

2. The improved tension gauge according to claim 1, wherein said pair of first element engaging surfaces is located on said sidewalls of said frame.

3. The improved tension gauge according to claim 1, wherein said first resilient means is a coil torsion spring mounted on said frame, said spring having a pair of legs, one leg being anchored to said frame, the other leg being secured to said first element engaging member.

4. The improved tension gauge according to claim 3, wherein said other leg of said spring is bent into a form defining a handle.

5. The improved tension gauge according to claim 4, wherein said frame includes means defining a grip thereon spaced from said handle, said first element engaging member being movable in said first direction in response to an operator's hand and fingers effecting a movement of said handle toward said grip to torque said spring.

6. The improved tension gauge according to claim 1, wherein said frame includes means defining a fixed pivot, wherein said means responsive to the movement of said second element engaging member includes a flange on said second element engaging member having an opening therethrough adjacent said pivot means, wherein said indicating means includes a two-arm lever pivotally mounted on said pivot means, one arm of said lever extending through said opening in said flange, said second resilient means being connected to and extending between said frame and the other of said arms.

7. The improved tension gauge according to claim 6, wherein said pivot means includes a pivot pin, wherein said two-arm lever is a wire looped intermediate the ends thereof, said loop being mounted on said pivot pin.

8. The improved tension gauge according to claim 6, wherein one of said sidewalls has an elongated slot therein with indicia alongside thereof, the longitudinal axis of said slot extending generally parallel to said base wall, and wherein the free end of said one arm extends through said slot.

9. The improved tension gauge according to claim 7, wherein said opening in said flange is conical, increasing in diameter away from said pivot pin, the narrow end of said opening being positioned adjacent the outer diameter portion of said loop whereby said narrow end will offer a minimum of surface area frictionally resisting movement of said one arm therein.

10. The improved tension gauge according to claim 1, wherein said first and second resilient means provide opposing spring forces, said second resilient means being significantly weaker than said first resilient means.

11. In a gauge for determining the tension on an element, comprising a frame having a pair of spaced coplanar first element engaging surfaces facing in substantially the same first direction, a first element engaging member supported on said frame for movement substantially parallel with said first direction, said first element engaging member having a second element engaging surface movable into and out of a first terminal position disposed between said first element engaging surfaces and substantially within the plane defined by said first element engaging surfaces, first resilient means urging said first element engaging member in a second direction opposite said first direction, and means supported on said frame for indicating the tension in said element, the improvement comprising:

a second element engaging member slidably supported on said frame for movement independent of said first element engaging member and substantially parallel with said first direction, said second element engaging member having a third element engaging surface facing in said first direction and movable between said first terminal position disposed between said first element engaging surfaces and substantially within said plane defined by said first element engaging surfaces and a second terminal position;

second resilient means urging said second element engaging member in said first direction toward said first terminal position;

wherein said second element engaging surface of said first element engaging member faces in said second direction, and said first resilient means urges said first element engaging member toward said first terminal position;

wherein said indicating means includes means responsive to the movement of said second element engaging member and said third element engaging surface thereon away from said first terminal position in said second direction to said second terminal position, the spacing between said first and second terminal positions being proportional to the tension on said element;

wherein said first resilient means is a coil torsion spring mounted on said frame, said spring having a pair of legs, one leg being anchored to said frame, the other leg being secured to said first element engaging member and being bent into a form defining a handle; and wherein said frame includes means defining a grip thereon spaced from said handle, said first element engaging member being movable in said first direction in response to an operator's hand and fingers effecting a movement of said handle toward said grip to torque said spring.

12. In a gauge for determining the tension on an element, comprising a frame having a pair of spaced coplanar first element engaging surfaces facing in substantially the same first direction, a first element engaging member supported on said frame for movement substantially parallel with said first direction, said first element engaging member having a second element engaging surface movable into and out of a first terminal position disposed between said first element engaging surfaces and substantially within the plane defined by said first element engaging surfaces, first resilient means urging said first element engaging member in a second direction opposite said first direction, and means supported on said frame for indicating the tension in said element, the improvement comprising:

a second element engaging member slidably supported on said frame for movement independent of said first element engaging member and substantially parallel with said first direction, said second element engaging member having a third element engaging surface facing in said first direction and movable between said first terminal position disposed between said first element engaging surfaces and substantially within said plane defined by said first element engaging surfaces and a second terminal position;

second resilient means urging said second element engaging member in said first direction toward said first terminal position;

wherein said second element engaging surface of said first element engaging member faces in said second direction, and said first resilient means urges said first element engaging member toward said first terminal position;

wherein said indicating means includes means responsive to the movement of said second element engaging member and said third element engaging surface thereon away from said first terminal position in said second direction to said second terminal position, the spacing between said first and second terminal positions being proportional to the tension on said element;

wherein said frame includes means defining a fixed pivot pin, wherein said means responsive to the movement of said second element engaging member includes a flange on said second element engaging member having an opening therethrough adjacent said pivot pin, wherein said indicating means includes a two-arm lever pivotally mounted on said pivot pin, one arm of said lever extending through said opening in said flange, said second resilient means being connected to and extending between said frame and the other of said arms;

wherein said two-arm lever is a wire looped intermediate the ends thereof, said loop being mounted on said pivot pin;

wherein said opening in said flange is conical, increasing in diameter away from said pivot pin, the narrow end of said opening being positioned adjacent the outer diameter portion of said loop whereby said narrow end will offer a minimum of surface area frictionally resisting movement of said one arm therein.

* * * * *